April 16, 1946.   L. C. BROOKS   2,398,404
CONSUMER-TYPE CONTAINER AND METHOD OF MAKING THE SAME
Filed Oct. 23, 1942   7 Sheets-Sheet 1
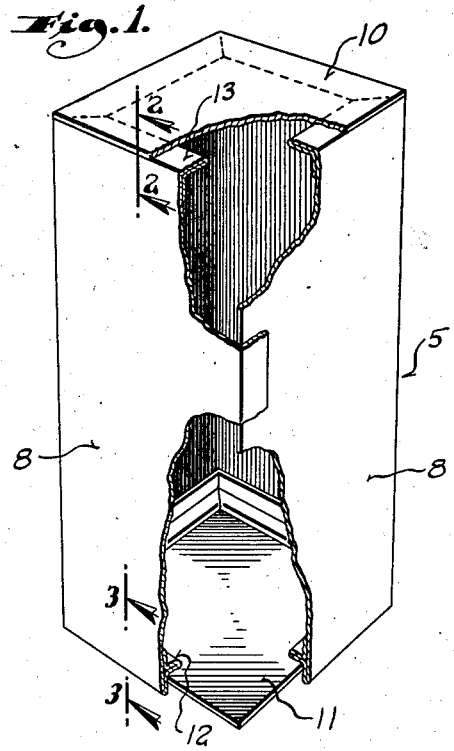
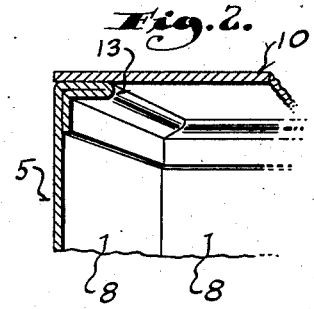
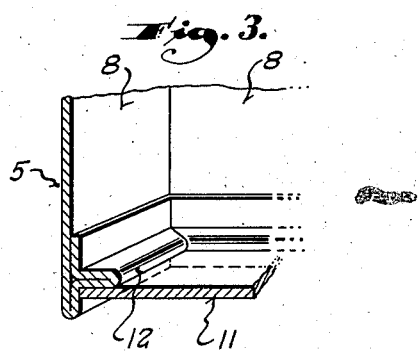
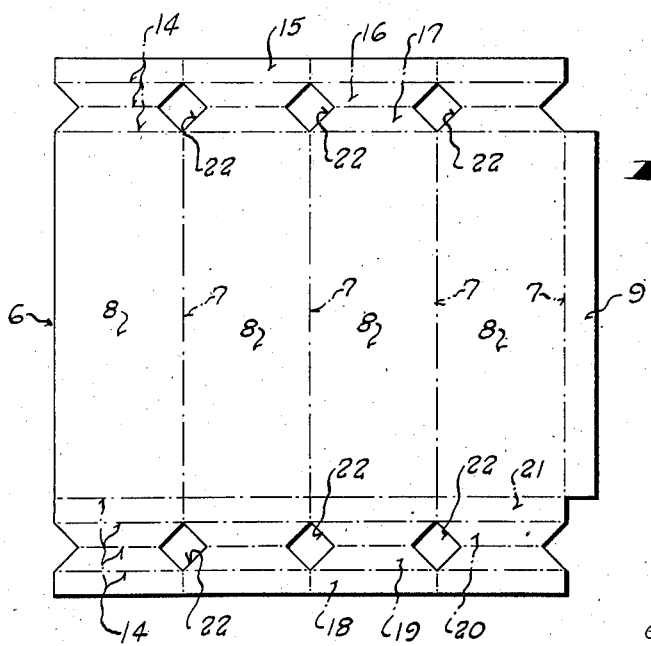
Inventor
Lewis C. Brooks
By
Attorney Inventor
Lewis C. Brooks April 16, 1946. L. C. BROOKS 2,398,404
CONSUMER-TYPE CONTAINER AND METHOD OF MAKING THE SAME
Filed Oct. 23, 1942 7 Sheets-Sheet 3

Inventor
Lewis C. Brooks
By
Attorney

April 16, 1946.　　　L. C. BROOKS　　　2,398,404
CONSUMER-TYPE CONTAINER AND METHOD OF MAKING THE SAME
Filed Oct. 23, 1942　　7 Sheets-Sheet 4

Inventor
Lewis C. Brooks

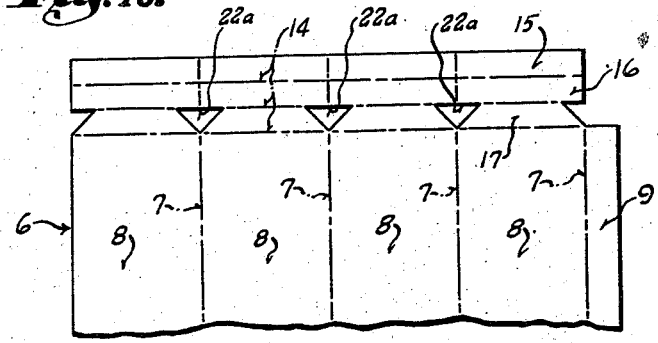
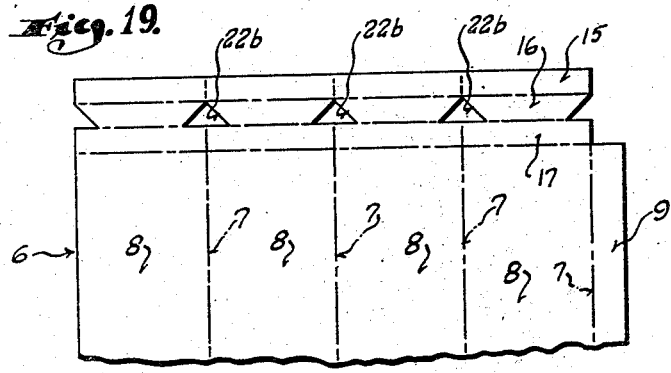
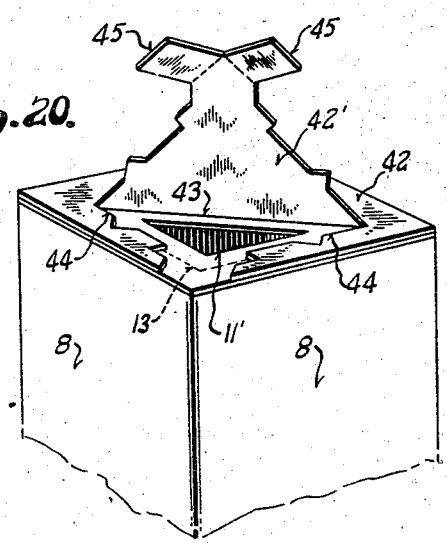

April 16, 1946. L. C. BROOKS 2,398,404
CONSUMER-TYPE CONTAINER AND METHOD OF MAKING THE SAME
Filed Oct. 23, 1942 7 Sheets-Sheet 6

Inventor
Lewis C. Brooks
By
Attorney

April 16, 1946. L. C. BROOKS 2,398,404
CONSUMER-TYPE CONTAINER AND METHOD OF MAKING THE SAME
Filed Oct. 23, 1942 7 Sheets-Sheet 7
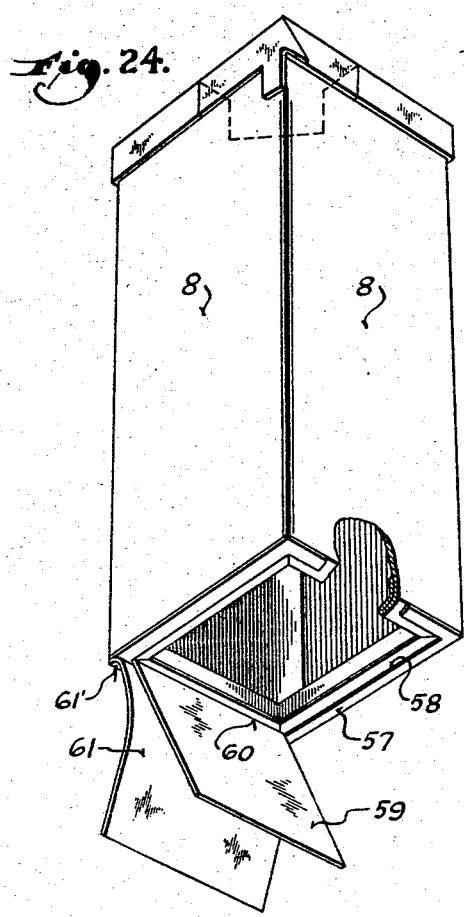
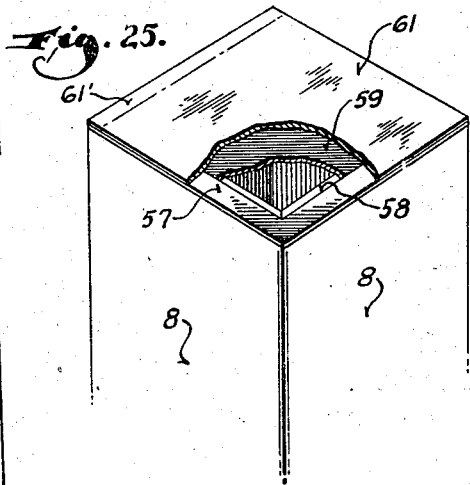
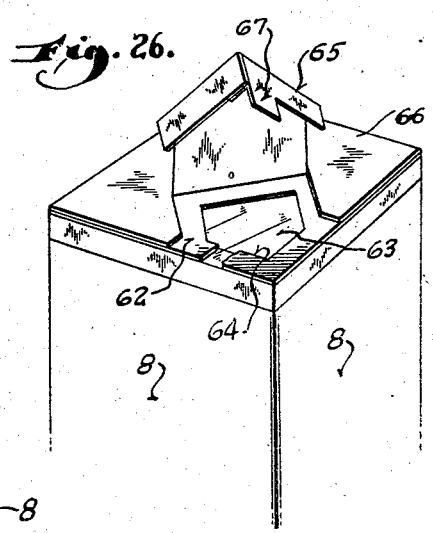
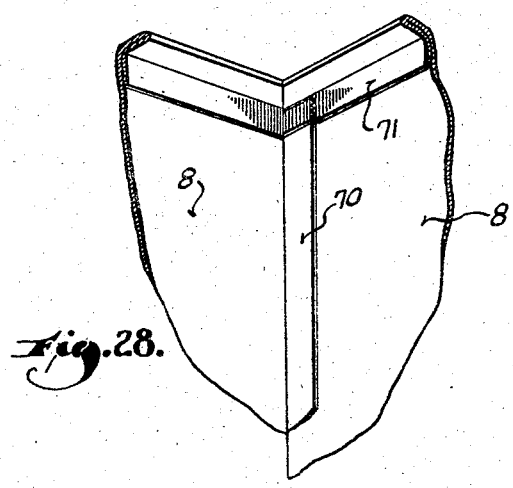
Inventor
Lewis C. Brooks
By Ira Shelton Jones
Attorney Patented Apr. 16, 1946

2,398,404

UNITED STATES PATENT OFFICE 2,398,404

CONSUMER-TYPE CONTAINER AND METHOD OF MAKING THE SAME

Lewis C. Brooks, Madison, Wis., assignor of one-third to Ira Milton Jones, Mequon, Wis.

Application October 23, 1942, Serial No. 463,101

11 Claims. (Cl. 229—5.5)

This invention relates to containers made of flexible materials such as fiber, plastics, and thin sheet metal, and has particular reference to consumer containers of the type used for household commodities and foods.

Heretofore fiber or paper containers have been either round cans with spiral or convolutely wound bodies and end closures in the form of caps of drawn fiber or tin; or square or oblong cartons with the end closures formed by gluing down flaps extended from the side walls.

These paper or fiber containers of the past have had but limited use because of the comparatively few products that can be safely packed in them. The number of products for which such containers can be used is infinitely less than that of the more efficient but also more expensive tin cans and glass containers.

In addition, all of the fiber or paper containers of the past have required separate labels, and in the case of cartons, that is, those containers generally of square or oblong construction wherein the end closures are formed by folding in and gluing down end flaps, the inevitable pin point openings at the corners of the glued flap closures has been a very serious objection.

Where such cartons are used for packaging products requiring protection from moisture it is necessary to use either a separate waxed paper bag inserted in the carton, or the so-called tight wrap style where a dampened outer paper wrap is shrunk over the outside of the carton. Both of these methods slow down production and entail increased costs and in addition the consumer must use an implement to cut or pry open the glued ends, and after opening no protection is afforded against the admission of dirt and air.

With these and other objections to paper and fiber containers heretofore available in mind, this invention has as a general object the provision of an entirely new type of consumer container made of three pieces, a body and two ends, so constructed and assembled that all of the disadvantages heretofore inherent in paper and fiber containers are entirely overcome, no separate bags, labels or wrapping being required. Instead, the present invention provides a container which may be made air-tight, sift-proof, and liquid-proof, with gloss lacquered printing on its face integral therewith and comparable to the decorated tin can or glass container.

Another object of this invention is to provide a container of the character described wherein adhesives with thermoplastic ingredients are employed in the attachment of the end closures so that by the use of proper heat and pressure the ends of the body may be bonded or welded shut with a hermetically sealed joint.

Another object of this invention is to provide a container of the character described and so constructed that the end closures may be secured in place either over suitable internal supports or entirely from the outside and wherein sufficient elasticity and stretch is present in the body and end closures to insure these parts conforming to each other in the bonding operation.

The containers of this invention are suitable for a wide variety of consumer goods such as cereals, cleanser powder, cocoa, etc., and when impregnated with melted paraffin are suitable for liquids like fluid milk, where the period of use of the container is relatively short.

Paper milk containers are, of course, not new in themselves. Patent No. 2,270,617 issued January 20, 1942 to R. D. Bennett is an illustration of such a container, but paper milk bottles heretofore and presently in use have numerous objections. The means employed to seal these containers has not been very satisfactory and in some instances, as in the patent above noted, resulted in a sloping upper end which made stacking of the filled containers difficult. Likewise pouring from such containers is difficult as the pouring opening is located in an awkward position.

The present invention overcomes these difficulties by providing a container that has a flat top with the opening so located that the contents may be readily poured therefrom.

Another advantage of the present invention, especially from the standpoint of its application to paper milk bottles, lies in the fact that milk bottles made in conformance therewith can be kept sealed or closed after their manufacture and until the very time the dairy fills them. The improved sanitation of this procedure over and above that wherein the containers must be left open until filled, is obvious.

In this connection it is also an advantage of the present invention that both ends of the container are flat.

Paper containers having flat top and bottom closures and in which these closures are not formed by overlapping flaps are not broadly new. Patent No. 2,089,958, issued August 17, 1937 to J. M. Hothersall affords an illustration of this feature.

However, with a view toward improving containers of this type, this invention has as another of its objects the provision of an improved manner of attaching the end closures to the body whereby weakening of the body by crimping or otherwise indenting the same is avoided, and whereby the attachment of the end closures to the body may be readily effected with production machinery.

While, as will appear hereinafter, this invention is capable of expression in a wide variety of different types and styles of containers, the feature which is largely responsible for the practical success of all of these containers is the construction of the end portions of the body to form shoulders to which the end closures may be adhered and to provide rigidity for the body, supporting the same against deformation and reinforcing the ends sufficiently to allow substantial endwise pressure to be applied on the containers.

An important aspect of this invention therefore resides in the novel manner in which the body blank is formed to produce these shoulders and it is therefore another object of this invention to provide a body blank so cut and scored that when formed up strong shoulders are provided at the ends of the body.

These shoulders, as previously noted, constitute an important factor in the attachment of the end closures and make possible a secure, tight juncture between the body and end closures and accomplish this objective entirely without weakening of the body by crimping or otherwise indenting the same as is required in some paper containers now in use.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 1 is a perspective view of a container embodying this invention, parts thereof being broken away and in section;

Figure 2 is a detail cross sectional view taken through Figure 1 on the plane of the line 2—2;

Figure 3 is a detail cross sectional view taken through Figure 1 on the plane of the line 3—3;

Figure 4 is a plan view of the blank from which the body of the container shown in Figure 1 is formed;

Figures 18 and 19 are views similar to Figure 4 illustrating slightly modified body blanks;

Figure 20 is a perspective view illustrating another form of top closure which is well adapted for use in milk bottles;

Figure 24 is a perspective view shown from the bottom of still another container suitable for liquid milk;

Figure 25 is a perspective view of the bottom portion of the container shown in Figure 24, with the bottom sealed shut and parts broken away;

Figure 26 is a perspective view of the top of the container shown in Figure 24;

Figure 28 is a detail perspective view illustrating an improved manner of joining the side walls of the container.

Figure 5:
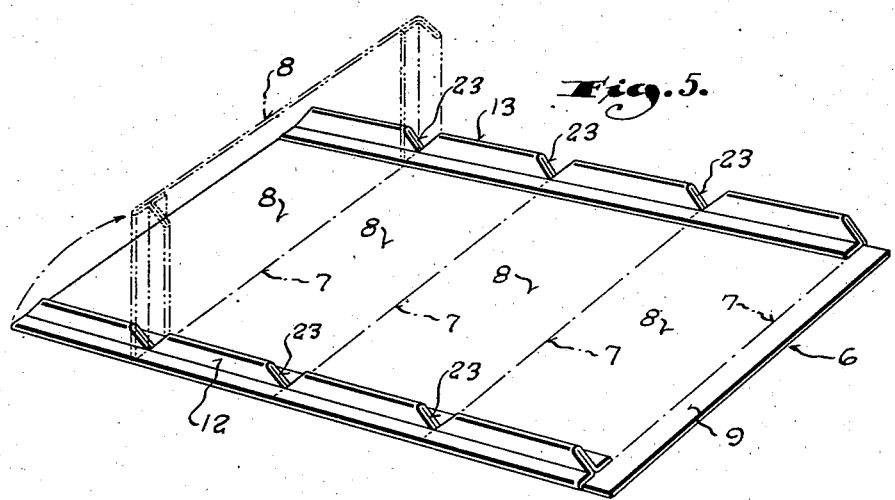
Figure 5 is a perspective view of the body blank partially formed and illustrating the manner in which its formation is completed.

Referring now particularly to the accompanying drawings, and especially to Sheet 1 (it being understood that like numerals indicate like parts) the numeral 5 designates the body of a flat sided square paper or fiber container.

This body is formed from a blank designated 6 and shown in Figure 4. Vertical score lines 7 divide the blank into four side wall forming panels 8 and a vertical glue flap 9 which is adapted to be adhered to the edge of the adjacent panel when the body is formed into its square tubular shape.

Where the lap formed by the attachment of the glue flap 9 to the adjacent panel is objectionable, the glue flap may be coextensive in size with the panel to which it is adhered.

The ends of the container are closed by end closures 10 and 11 secured to the ends of the body. These end closures may take any one of a wide variety of shapes. They may be plain flat discs as shown in Figure 1 or they may be arranged to have a telescoping fit with the ends of the body as shown in several of the other figures.

In all instances, though, the ends of the body have end-closure supporting shoulders to which the end closures or a part thereof may be adhered.

These end-closure supporting shoulders have at least their outwardly facing surfaces horizontal and perpendicular to the side walls to enable the end closures to be bonded thereto, and in all instances these shoulders are formed as integral parts of the side walls.

In the embodiment of the invention shown in Figure 1, the bottom closure 11 is supported by and adhered to an inwardly directed flange 12 set in or upwardly from the lower edge of the body, while the top closure 10 is adhered to an inwardly directed flange 13 which is flush with the end of the closure.

These closure supporting ledges or flanges are formed on the blank 6 before the blank is made up into the tubular body.

To this end the opposite marginal edges of the blank which are to define the open ends of the body are scored horizontally as at 14 to divide these opposite edge portions of the blank into three adjacent transverse strips 15, 16 and 17 at that edge of the blank which is to have the flange 13 and into four adjacent strips 18, 19, 20 and 21 at that edge of the blank which is to form the end of the body having the flange 12.

Where the closure supporting shoulders are inwardly directed flanges as in Figure 1, the second and third strips 16 and 17, and 19 and 20 have portions thereof on the score lines 7 cut away as at 22. This removes the excess stock and results in V-shaped notches 23 in the upstanding flanges formed by folding of the strips on the score lines 14 to the shape illustrated in Figure 5.

If the openings 22 are diamond shaped as in Figure 4, both thicknesses of the flanges forming the shoulders are cut away. This results in a smooth clean corner with the top and bottom surfaces of the shoulders flush, but it may entail leakage at the extreme corners after the end closure disc is secured in place. To overcome this disadvantage, the openings may be triangular and only in either the second or third strip. If a triangular opening is cut in the third strip as shown at 22a in Figure 18, the inner thickness of the double thickness flange forming the shoulder is left uncut to fold or crimp up as the body is formed up, and if a triangular opening is cut into only the second strip as shown at 22b in Figure 19, the outer thickness of the shoulder is left uncut to fold or crimp up as the body is formed up. In each instance, though, an unbroken wall extends around the corners of the shoulder to insure a tighter closure.

It is to be observed that the outer or marginal strips 15 and 18 remain uncut throughout their entire length. This materially strengthens the structure as these uncut strips are adhered to the face of the blank and extend unbrokenly around the corners of the container or at least around all but the one corner where the lapped seam occurs.

If the lapped seam is positioned in the middle of one of the side panels, the uncut marginal edges 15 and 18 can extend unbrokenly around all of the corners of the box.

As indicated by light construction lines in Figure 5, in forming the body the panels 8 of the blank are bent at right angles to each other and in doing so the V-shaped notches 23 close up so that the flanges 12 and 13 are substantially continuous around the entire perimeter of the body.

In both instances, that is, top and bottom, the shoulders formed by the flanges 12 and 13 not only provide a surface to which the end closures may be bonded but the L and T shaped cross section thereof supports the ends of the side panels against deflection either inward or outward.

Figure 17:
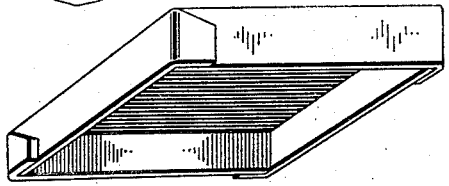
Figure 17 is a perspective view of another type of end closure.

Hence, in instances where the end closures are in the form of a cap such as illustrated in Figure 17, the necessary sealing pressure may be applied on the sides of the cap without deforming the ends of the body.

It is to be noted in connection with this type of closure where flanges are adhered to the sides of the body, that it is important that the flanges of the cap are not connected with each other at the corners before their adhesion to the body side walls, and if desired, the flanges may have corner flaps to fold around the corners. The reason for leaving the flanges free of each other at the corners prior to their adhesion to the body side walls, is that the cap must be free to stretch to have it conform to the body during the sealing operation.

Figure 6:
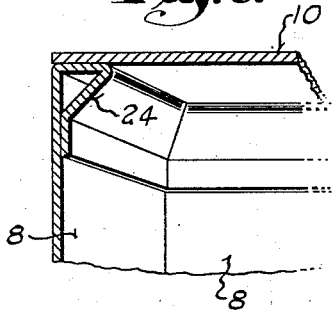
Figure 6 is a cross sectional view similar to Figure 2 illustrating a slightly modified embodiment of this invention.
Figure 7:
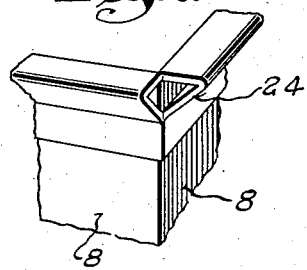
Figure 7 is a perspective view illustrating one corner of the body and showing another adaptation of the invention.

The end-closure supporting shoulders of Figure 1 have their horizontal portions formed by overlapping or double thicknesses of stock. Another very suitable way of forming the shoulders is illustrated in Figures 6 and 7. In this case the shoulders have diagonal brace portions 24 extending from the outer edges of the shoulders back to the adjacent face of the side panel. In Figure 6 the shoulders project inwardly of the container; while in Figure 7 they extend outwardly. In the latter case it is only necessary to slit the second and third strips along the edges of the blank as distinguished from actually cutting away the portions 22.

Figure 21:
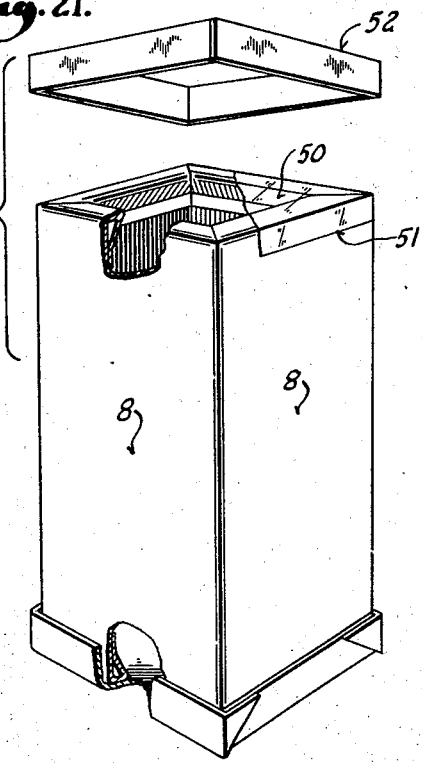
Figure 21 is a perspective view of another milk bottle with parts broken away and with the cap removed.

The diagonally braced construction shown in Figures 6 and 7 is exceptionally strong and greatly reinforces the container. In fact, the strength achieved with this construction enables the container to be used as a full opening milk bottle as shown in Figure 21. Even when filled and with the cap removed the bottle shown in Figure 21 may be grasped across the corners and its contents poured therefrom without collapsing or deforming the body. This form of shoulder construction is especially well adapted for use in containers intended for liquids as the slope of the diagonal brace portion enables smooth flow of the liquid over the shoulder.

Figure 8:
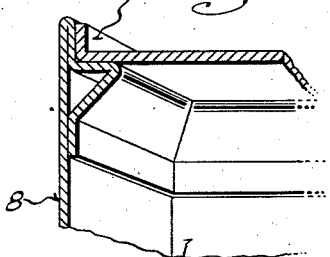
Figures 8, 9 and 10 are detail sectional views which, like Figure 6, illustrate other embodiments of the invention.

Figure 8 illustrates the adaptation of the diagonally braced shoulder to the inset construction as employed at the bottom of the container in Figure 1. This view also shows the use of an end closure having side flanges 25 to be adhered to the inner sides of the container outwardly of the shoulder.

Figure 9:
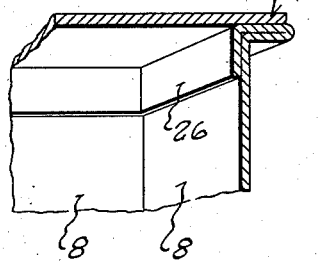
Figure 13:
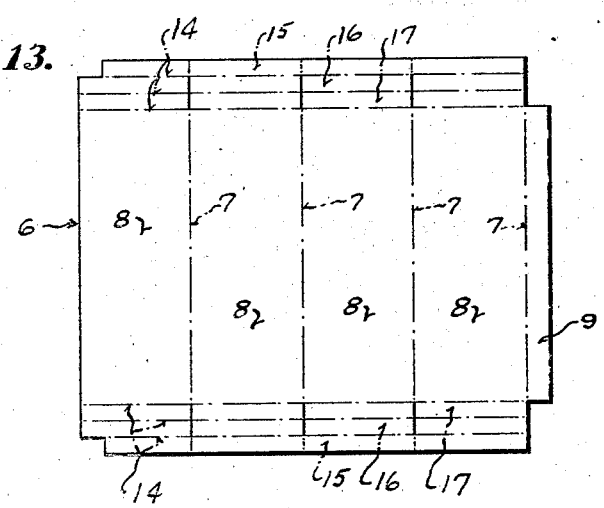
Figure 13 is a plan view of the blank of which the body of the container shown in Figure 11 is formed.
Figure 14:
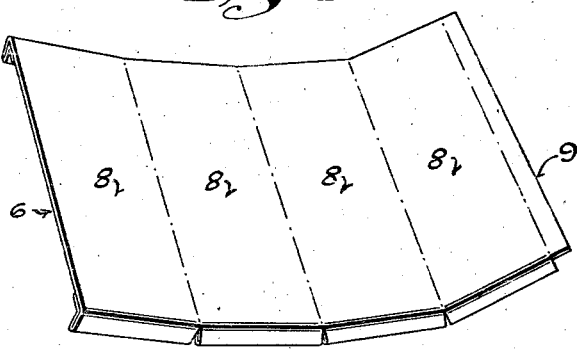
Figure 14 is a perspective view of the body blank partially formed.

Another way of forming the closure supporting shoulder is illustrated in Figure 9. In this instance the unbroken or uncut marginal strip 26 overlies the inner face of the side walls but the flange forming the shoulder projects outwardly. This provides an exceptionally strong construction inasmuch as no cuts like the openings 22 or slits shown in Figure 13 are required in the blank. It has been found that by bringing the marginal anchor strip in and attaching it to the inside surfaces, the amount of overhang needed for a shoulder of the desired width is sufficiently small to enable the material to stretch without breaking as the body is formed. Any slight deflection of the shoulder from its proper horizontal plane as a result of this stretch can be easily corrected in the application of the closure disc.

The advantages of the uncut ledge are further realized by having the vertical body lap located in one side panel rather than at one corner.

Figure 10:
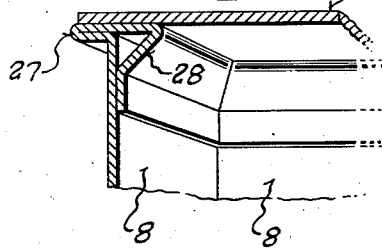

The construction illustrated in Figure 10 incorporates both the double thickness idea and the diagonal supporting feature by having a double thickness flange 27 projecting in one direction either inwardly or outwardly and a diagonal brace formation 28 at the opposite side of the panel. This construction requires four horizontal strips with the third strip wider than the others, but its added strength makes up for the increased stock and additional folding.

Figure 11:
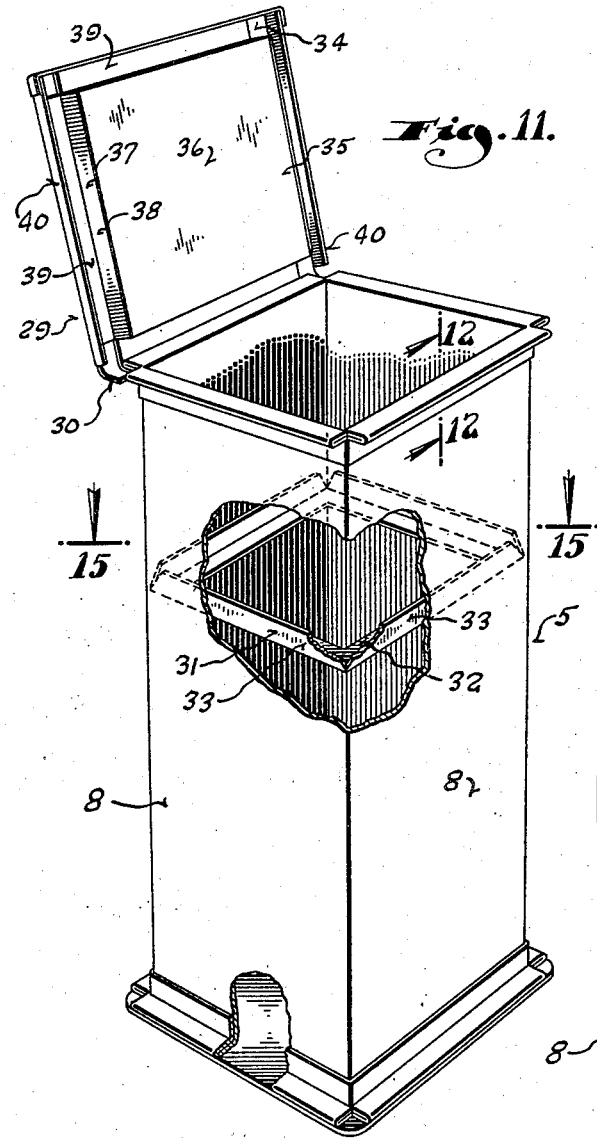
Figure 11 is a perspective view of a paper milk bottle constructed in accordance with this invention, parts thereof being broken away and in section.
Figure 12:
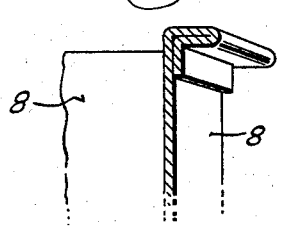
Figure 12 is a detail sectional view taken through Figure 11 on the plane of the line 12—12.
Figure 15:
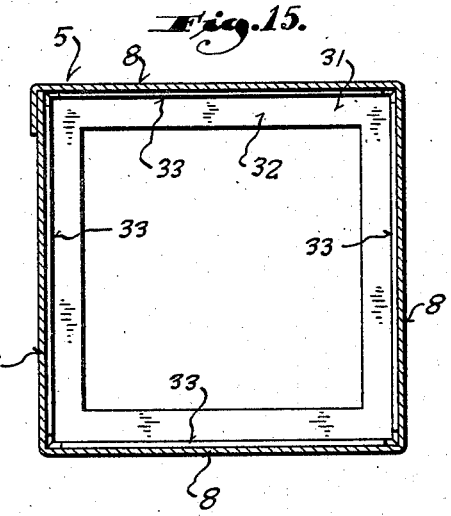
Figure 15 is a detail cross sectional view taken through Figure 11 on the plane of the line 15—15.

In the application of this invention to paper milk bottles, the construction illustrated in Figure 11 may be used but is not as desirable as some of the constructions illustrated in Figures 21 to 28, inclusive. In the construction shown in Figure 11 the bottom is provided in any suitable manner as by an end closure disc adhered to an outwardly directed shoulder and the top of the body is closed by a friction plug type of cap 29, preferably hinged as at 30 to one side wall of the body.

The body blank in this case, as shown in Figure 13, has only the slits at the score lines 7 across the second and third strips 16 and 17 which suffice for the formation of the outwardly directed shoulders.

The edges of the open end of the body are thus reinforced against deflection by the outwardly projecting shoulders formed in the manner described, and to preclude diagonal collapsing of the body when the filled container is picked up and its contents poured from one corner, a strengthening or reinforcing member 31 is provided. This reinforcing member consists of a flat disc 32 having its medial portion cut away, and provided with laterally directed flanges 33 which are adhered to the inner surfaces of the body side walls.

Being formed from a single blank, this reinforcing member greatly strengthens the open end of the body and supports the same against diagonal collapse.

Figure 16:
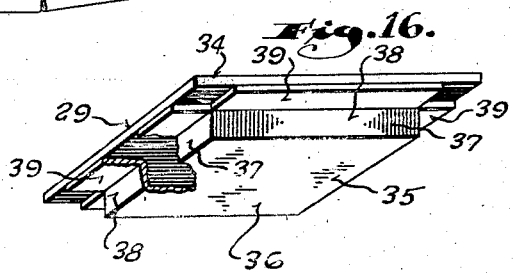
Figure 16 is a perspective view illustrating a friction plug type of end closure similar to the one employed in the milk bottle shown in Figure 11.

The friction plug cap 29 is formed as illustrated in Figure 16 and comprises a disc 34 of a size to extend over the entire flanged open end of the body and a plug portion 35 formed from a blank of paper board or fiber board having a flat disc portion 36 and flanges 37 at its edges bent to form vertical sides 38 and horizontal attaching portions 39 which are bonded to the undersurface of the disc 34.

If desired, the disc 34 may have down-turned marginal edge portions 40 as shown in Figure 11 and where the cap is to be hinged in place it is preferable to form the hinge by an extension of one of the flanges 37.

The closure shown in Figure 20, which may be used in lieu of the friction plug, consists of a flat disc 41 adhered to the shoulder 13 and cut out to provide a triangular opening 41' in one corner. Adhered to this disc is an outer disc 42 cut and scored to define a flap 42' which is initially in the plane of the disc 42 but is easily lifted on its hinge 43 formed by the score line which in the case illustrated where the flap is at the corner, extends diagonally.

Attention is directed to the fact that the cut lines 44 which define the sides of the flap lie outwardly of the inner edges of the opening in the disc 42 and are so shaped that the corner of the disc which forms the tip of the flap extends across that portion of the disc 41 at the corner of its opening to be supported by the shoulders 13. Also, the sides of the flap defined by the cut lines 44 have outward projections 45 which also extend over the shoulders 13 when the flap is closed. Thus during application of the closure the flap is supported against depression into the container.

If desired, a thin sheet of suitable material may be interposed between the closure discs. This would insure against leakage although the lines 44 are cut wholly through the stock and would afford a convenient consumer opening as secure adhesion of the flap in closed position would not be required.

As noted hereinbefore the container of this invention, when coated with paraffin, is admirably well suited to use as a disposable milk bottle, and in Figures 21 to 27 inclusive, several different forms of the invention applied to this use are illustrated.

The bottle shown in Figure 21, as hereinbefore mentioned, has both ends of its body provided with the diagonally reinforced type of shoulder and is adapted to be filled through the open top.

After filling, a sealing sheet 50 of "glassine" or other suitable material is adhered to the shoulder with its marginal edge portions 51 folded over and adhered to the sides of the body. A flat cover or cap 52 is then applied over the sealed end.

When the bottle is completed by the manufacturer, the cover or cap 52 is applied so that the bottle reaches the dairy closed and protected against insanitation from the time it is manufactured until just before it is filled.

The advantage of this construction resides in the full opening top made possible by the rigidity afforded to the body by the diagonal shoulder construction.

Figure 22:
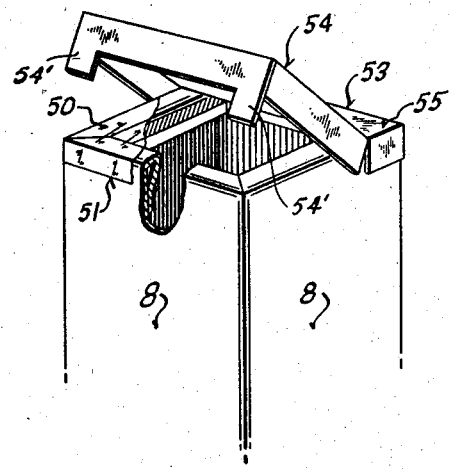
Figures 22 and 23 are perspective views of the top portions of other milk bottles constructed in accordance with this invention.

The construction illustrated in Figure 22 is similar to that of Figure 21 but the cap 53 is provided with a hinged portion 54 and a fixed portion 55, the latter being secured to the body while the former is adapted to be held closed by the attachment of the tabs 54' to the adjacent walls of the body. As in the bottle shown in Figure 21, the cap 53 is not secured in place until after the bottle is filled and the "glassine" seal 50 is applied.

This construction has the advantage of adding rigidity to the open end portion of the bottle by virtue of the securement of its fixed portion 55 to the body. In addition it provides a convenient consumer cap which can be readily opened and closed.

Figure 23:
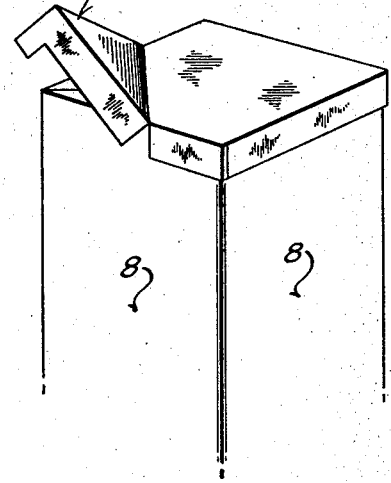

A variation of the construction just described is illustrated in Figure 23. Here the hinged cover flap 56 is triangular and extends only across one corner. In all other respects, however, the construction of Figure 23 is like that of Figure 22.

Figures 24, 25 and 26 show a milk bottle construction which is adapted to be filled through the bottom. In this case, a cut and scored disc 57 is adhered to the bottom shoulder which may be either the dual thickness straight shoulder shown in Figure 2 or the diagonally braced shoulder construction. This disc 57 is cut to provide a square opening 58 somewhat larger than the opening defined by the shoulders so as to leave the inner edge portion of the shoulders uncovered when the central part 59 of the disc is hinged back on its scored hinge 60 to an open position.

After the bottle is filled through this opening, the flap 59 is closed and adhered to the shoulder either directly or with a sheet of sealing material interposed therebetween, and then an outer cover flap 61 hinged to an attaching edge portion 61' is brought down and adhered over the entire bottom.

The top of the bottle has a consumer opening which is sealed and closed during the manufacture of the bottle and which consists of an inner disc 62 adhered to the shoulder with a sheet of "glassine" or other sealing material 63 interposed therebetween. This inner disc 62 has a pouring opening 64 in one corner thereof exposing the "glassine" sealing sheet when a hinged flap 65 which constitutes part of an outer disc 66 is lifted.

The flap 65 is held in its closed position by a tab 67 adhered to one of the side walls.

Figure 27:
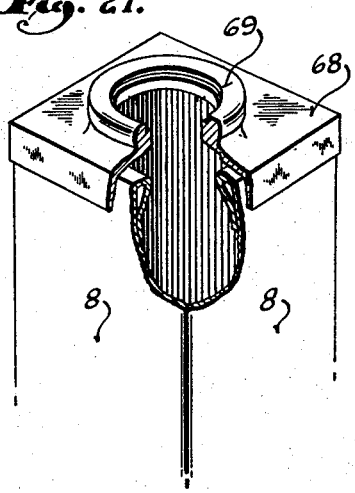
Figure 27 is a perspective view of the top portion of still another milk bottle constructed in accordance with this invention.

In the construction shown in Figure 27 the paper milk bottle of this invention is adapted to use with the present day dairy equipment for filling and capping, through the use of a special top cap 68 telescoped over and adhered to the open end of the body. This cap is made of suitable plastic material and has an upstanding neck 69 which substantially duplicates the open top of a present day glass milk bottle thus accommodating the bottle to use with the present day glass bottle filling and capping machinery.

In most of the embodiments of the invention illustrated the vertical glue flap of the body is adhered to the outside of the fourth panel. However, it may be adhered on the inside as shown in Figure 28 and when this is done an especially strong construction is obtained by having the inside vertical glue flap 70 extend up under the anchor strip 71 of the fourth panel.

To permit this construction it is, of course, necessary that during the folding of the marginal strips to form the shoulders the extremities of the anchor strip 71 be left unadhered to the fourth panel to permit the insertion of the glue flap 70 thereunder.

From the foregoing description, taken in connection with the accompanying drawings, it will be readily apparent to those skilled in the art that this invention provides a substantial improvement in fiber containers, particularly with respect to the manner in which the ends of the body are reenforced to accommodate a wide variety of closures through which the containers of this invention can be adapted to a wide range of consumer goods.

What I claim as my invention is:

1. In a fiber container of the character described: a body having flat side walls and angular corners, said side walls at one end of the container having integral inwardly directed closure supporting shoulders consisting of the marginal portions of the side walls bent inwardly on themselves with the extreme marginal edge portions thereof lying flat against the inner surface of the side walls and the part intervening between said extreme marginal edge portions and the line of the bend folded and formed to provide an inwardly directed ledge perpendicular to the side walls and an inclined portion joining the edge of said perpendicular ledge forming portion and said extreme marginal edge portion, the extreme marginal edge portion being continuous and unbroken for its entire length and being adhered to the inner surface of the side walls at a distance from the perpendicular ledge forming portion so that the inclined portion supports the ledge portion and facilitates pouring the container contents past the shoulder.

2. In a fiber container of the character described: a body formed from a single blank of fiber board and having flat sides and angular corners; a closure at one end of the body, the other end of the body being open; and a reinforcing closure supporting shoulder extending around the edge of the open end and formed integrally with the body by marginal portions of the side walls bent back on themselves with the extreme marginal portions thereof forming one continuous unbroken anchor strip lying flat against the side walls and the part intervening between said extreme marginal portions and the line of the bend folded and formed into a closure supporting portion perpendicular to the side walls and a portion joining the edge of said perpendicular portion and said continuous and unbroken extreme marginal portion, said continuous and unbroken extreme marginal portion being adhered to the side walls at a distance from the perpendicular portion.

3. In a fiber container of the character described: a body formed from a single blank of fiber board and having flat sides and angular corners; a closure at one end of the body, the other end of the body being open; a reinforcing closure supporting shoulder extending around the edge of the open end and formed integrally with the body by marginal portions of the side walls bent back on themselves with the extreme marginal portions thereof forming one continuous unbroken anchor strip lying flat against the side walls and the part intervening between said extreme marginal portions and the line of the bend folded and formed to have an outer surface perpendicular to the side walls and an inclined surface joining the edge of said perpendicular portion and said continuous and unbroken extreme marginal portion; a thin sealing sheet adhered to the exterior of the open end of the body; and a cap readily removably fitted over the open end of the body.

4. In a fiber container of the character described: a body having flat sides and sharply defined angular corners; a closure for one end of the body comprising a flat disc of a size to cover the open end of the body, and a plug portion adhered to the undersurface of the disc to frictionally engage in the open end of the body, said plug portion being formed of fiber board and comprising a flat disc of a size to fit into the open end of the container, and side walls formed integrally with the disc and folded to have portions thereof perpendicular to the plane of the disc and other portions directed laterally outwardly to form flanges overlying the undersurface of the main closure disc, said flanges being adhered to the undersurface of the main closure disc.

5. A consumer type container made of flexible sheet material and having a body formed with flat side walls and having flat end closures characterized by the provision of an inner shoulder extending around the body at least at one end thereof, flush with the end of the body and perpendicular to the side walls thereof to provide an inwardly directed ledge to which the end closure may be adhered, said shoulder being formed of flexible sheet material and having an anchor strip extending unbrokenly around all but one corner of the body and adhered to inner surface of the side walls thereof at a distance from the ledge; and a diagonal portion integral with the ledge and said anchor strip and extending diagonally from the edge of the ledge to the side walls to support the ledge and guide the contents of the container past the ledge.

6. In a consumer type container having a flat-sided body made by folding a single blank on appropriate score lines: an end closure supporting ledge extending around the body at one end thereof, said ledge comprising a plurality of strips of flexible material long enough to extend about the perimeter of the body, the outer one of said strips being unbroken for its entire length and at least one of the inner strips being cut adjacent to the corners of the body to enable folding the shoulder formed by the strips around the corners of the body with the outer surface of the shoulder flush with the end of the body and perpendicular to its side walls and its unbroken strip extending around at least all but one corner of the body and secured to the side walls thereof at a distance in from the perpendicular shoulder.

7. In a container of the character described: a flat sided body; a closure supporting ledge extending around one end of the body, said ledge comprising a double thickness of flexible sheet material having an outer surface flush with the end of the body and perpendicular to its side walls; and a closure disc supported by said ledge, said closure disc having a flap portion defined by cut and scored lines, extending out to the edge of the disc so that the flap overlies the ledge and receives support therefrom.

8. In a consumer type container having a flat-sided body made by folding a single blank on appropriate score lines: an end closure supporting ledge projecting in from the sides of the container and extending around the body at one end thereof, said ledge flush with said end of the body and comprising a plurality of strips integral with the side walls of the body and defined therefrom by score lines extending across the entire blank from which the body is formed and transversely to the score lines defining the side walls of the body from each other so that said strips extend about the perimeter of the body, the outermost of said strips formed by an edge portion of the blank being unbroken for its entire length, and at least one of the inner strips being cut adjacent to the corners of the body to facilitate folding the shoulder formed by the strips around the corners of the body with the outer surface of the shoulder flush with the end of the body and perpendicular to its side walls and its unbroken strip extending around at least all but one corner of the body and secured to the side walls thereof.

9. In a consumer-type container having a flat-sided body made by folding a single blank on appropriate score lines: an end closure supporting ledge extending around the body at one end thereof and flush with said end of the body, said ledge comprising a plurality of strips integral with the side walls of the body and defined therefrom by score lines extending across the entire blank from which the body is formed and transversely to the score lines defining the side walls of the body from each other so that said strips extend about the perimeter of the body, the outermost of said strips which is formed by an edge portion of the blank being unbroken for its entire length, and at least one of the inner strips being cut adjacent to the corners of the body to facilitate folding the shoulder formed by the strips around the corners of the body with the outer surface of the shoulder flush with the end of the body and perpendicular to its side walls and its unbroken strip extending around at least all but one corner of the body and secured to the side walls thereof; and a laminated end closure supported on and secured to said outer surface of the ledge, the inner lamination of said end closure being a thin frangible sealing sheet unbroken throughout its entire area and confined between the outer lamination and the ledge, and the outer lamination having a hinged flap portion therein defined by suitably cut lines, said flap portion covering a corner of the body and extending beyond the adjacent inner edges of the ledge so that the flap portion as well as the remainder of the closure is supported by the ledge.

10. In a fiber container of the character described: a body formed from a single blank of fiber board and having flat sides and angular corners; a closure at one end of the body, the other end of the body being open; a reinforcing closure supporting shoulder extending around the edge of the open end and formed integrally with the body by marginal portions of the side walls bent back on themselves with the extreme marginal portions thereof forming one continuous unbroken anchor strip lying flat against and adhered to the side walls and the part intervening between said extreme marginal portions and the line of the bend folded and formed into a ledge perpendicular to and flush with the ends of the side walls; a thin sealing sheet adhered to the exterior of the open end of the body and supported by said ledge; and a protecting cover for said sealing sheet secured over the open end of the body and supported by the ledge.

11. In the manufacture of fiber containers, the step of forming a tubular flat sided body having angular corners and an inwardly directed closure supporting ledge flush with one end which comprises: scoring a blank to divide the same into the required number of vertical side panels; scoring the blank horizontally along the edge at which the ledge is to be located at different distances from said edge to define three adjacent strips extending transversely across the ends of the side panels; cutting away portions of the inner two strips at the vertical score lines; folding the horizontal strips on the score lines defining the same to dispose the innermost strip perpendicular to the side walls, the middle strip at a diagonal angle to said side walls and the outermost unbroken strip flat against the side walls; adhering said outermost unbroken strip to the side walls to secure said strips in their defined positions; folding the blank at its vertical score lines into a tubular structure with the perpendicular ledge facing inwardly and the ends of the ledge on adjacent side walls abutting each other; and securing the side edges of the body blank together.

LEWIS C. BROOKS.